J. J. D. KINGSBURY.
Weighing Apparatus for Wagons.

No. 166,389.          Patented Aug. 3, 1875.

Witnesses
Chas. H. Smith
Harold Serrell

Inventor
John J. D. Kingsbury
per Lemuel W. Serrell
atty.

UNITED STATES PATENT OFFICE

JOHN J. D. KINGSBURY, OF EAST BLOOMFIELD, NEW YORK.

IMPROVEMENT IN WEIGHING APPARATUS FOR WAGONS.

Specification forming part of Letters Patent No. 166,389, dated August 3, 1875; application filed June 23, 1875.

*To all whom it may concern:*

Be it known that I, JOHN J. D. KINGSBURY, of East Bloomfield, in the county of Ontario and State of New York, have invented a Combined Spring and Weighing Apparatus for Wagons, of which the following is a specification:

The farm-wagons in general use are made without springs, and the box or platform is placed directly upon the cross-bars or bolsters. In placing articles into one of these wagons, a person is often deceived as to the weight of the load, and too much is loaded, and the animals strained in drawing the same, or else time is lost by too small a load.

My invention is made for the purpose of relieving the vehicle from concussion, and at the same time furnishing a means for approximately ascertaining the weight placed in the wagon.

I make use of four bolster-bars, with intermediate helical or other springs, and four vertical scale-rods, that act also as guides for the platform or box. These four scale-rods are marked with divisions that indicate in pounds or other designation the weight placed in the vehicle. There being by preference four points at which the weight is indicated, the wagon can be loaded up with greater uniformity than heretofore, and each wheel caused to take its proper proportion of the load, and where the load is not uniformly distributed the total weight will be ascertained by either the average of the weights indicated at the scale-rods, or by the aggregate amount indicated.

Figure 1:
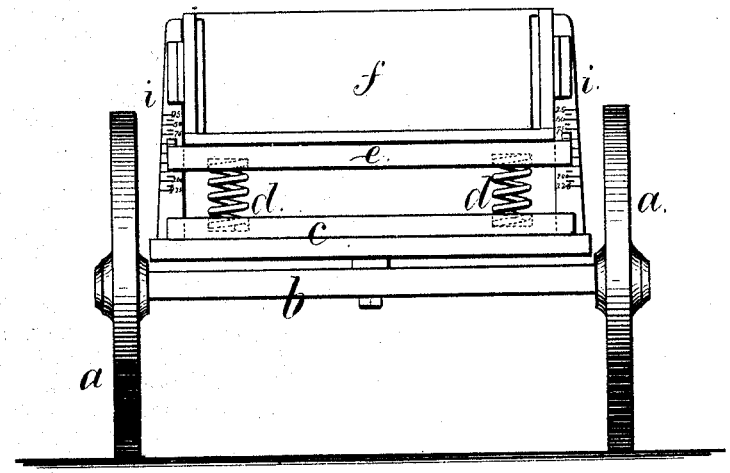
Figure 2:
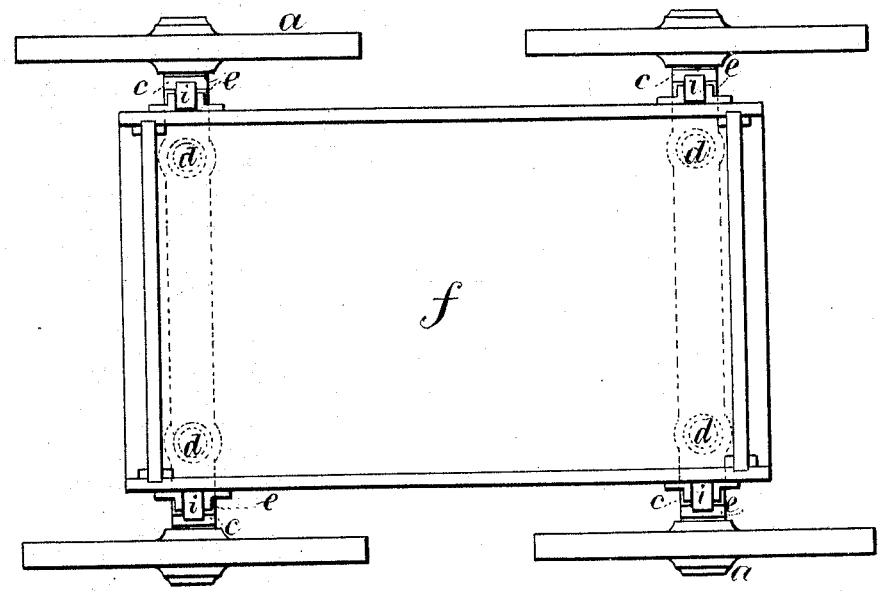

In the drawing, Figure 1 is an elevation of the weighing device with the wagon-box in section, and Fig. 2 is a plan of the box and scale-rods.

The wheels $a\ a$ and axles $b\ b$ are of any usual character, and the front axle turns upon a king-bolt. $c\ c$ are the lower bolster-bars, connected with or resting upon the respective axles, and $d\ d$ are springs that are placed between the bolster-bars $c$ and the upper bolster-bars $e$. These springs are, by preference, helical or spiral, and located toward the ends of the respective bolster-bars. The scale-rods $i$ are vertical, and they are attached at their lower ends to the bolster-bars $c$, and the upper bolster-bars $e$ slide freely up and down upon these scale-rods, and said scale-rods may also serve to guide or retain the platform or wagon-box $f$ in position.

The scale-rods $i$ are marked with divisions and numbers, and pointers or indicating-surfaces upon the bars $c$, contiguous to these rods, indicate the point to which the load or weight has depressed the springs, so that a near approximation to the weight may be arrived at by the aggregate or average of the weights indicated at the four scale-rods, according to the manner in which the respective rods are marked.

It is preferable to have four of these scale-rods at the ends of the pairs of bolsters; but, if desired, two of the scale-rods may be used, if they are placed at or near the centers of the bolster-bars.

I do not claim a weighing apparatus applied to a cart, as the same is well known, especially with coal-carts; neither do I claim a weighing apparatus containing two or more springs, as such have been used beneath a case or measure.

I claim as my invention—

The bolster-bars $c\ c\ e\ e$, springs $d\ d$, and scale-rods $i\ i$, arranged as specified, and combined with the wheels, axles, and platform or box of a wagon, in the manner and for the purposes set forth.

Signed by me this 21st day of June, A. D. 1875.

JOHN J. D. KINGSBURY.

Witnesses:
GEO. T. PINCKNEY,
CHAS. H. SMITH.